United States Patent
Stapleton

(10) Patent No.: US 12,341,871 B2
(45) Date of Patent: Jun. 24, 2025

(54) PRACTICAL ITEMIZED ENCRYPTION FOR CRYPTOGRAPHIC ERASURE (PIECE)

(71) Applicant: Wells Fargo Bank, N.A., San Francisco, CA (US)

(72) Inventor: Jeffrey J. Stapleton, O'Fallon, MO (US)

(*) Notice: Subject to any disclaimer, the term of this patent is extended or adjusted under 35 U.S.C. 154(b) by 165 days.

(21) Appl. No.: 18/223,956

(22) Filed: Jul. 19, 2023

(65) Prior Publication Data
US 2025/0030538 A1    Jan. 23, 2025

(51) Int. Cl.
*H04L 29/06* (2006.01)
*H04L 9/06* (2006.01)
*H04L 9/08* (2006.01)

(52) U.S. Cl.
CPC .......... *H04L 9/0637* (2013.01); *H04L 9/0869* (2013.01)

(58) Field of Classification Search
None
See application file for complete search history.

(56) References Cited

U.S. PATENT DOCUMENTS

2014/0337640 A1* 11/2014 Sharma ................. G06F 21/602
713/193

FOREIGN PATENT DOCUMENTS

CN           111338572 A  *  6/2020  ........... G06F 21/602

* cited by examiner

*Primary Examiner* — Andrew J Steinle
(74) *Attorney, Agent, or Firm* — Foley & Lardner LLP

(57) ABSTRACT

The arrangements disclosed herein relate to systems, apparatus, methods, and non-transitory computer readable media for determining to erase a plurality of ciphertext blocks stored in a memory device, in response to determining to erase the plurality of ciphertext blocks, performing a cryptographic erasure of the plurality of ciphertext blocks. The cryptographic erasure includes encrypting each of the plurality of ciphertext blocks with a random key and destroying the random key in response to encrypting each of the plurality of ciphertext blocks.

20 Claims, 5 Drawing Sheets

PRACTICAL ITEMIZED ENCRYPTION FOR CRYPTOGRAPHIC ERASURE (PIECE)

BACKGROUND

Sanitization is a process by which access to target data on a storage medium is rendered infeasible for a given level of effort. Electronic media (or soft copy) include devices that store data as bits and bytes, such as hard drives, Random Access Memory (RAM), Read-Only Memory (ROM), disks, flash memory, memory devices, phones, mobile computing devices, networking devices, office equipment, and so on. Flash memory-based storage devices, including Solid State Drives (SSDs), have become increasingly prevalent due to improved costs, higher performance, and shock resistance. SSDs are becoming more pervasive in storage technology. Degaussing, a fundamental way to sanitize magnetic media, no longer applies in most cases for flash memory-based devices. New storage technologies, including variations of magnetic storage, also require sanitization research and require a reinvestigation of sanitization procedures to ensure efficacy and security.

For storage devices containing magnetic media, a single overwrite pass with a fixed pattern such as binary zeros typically hinders recovery of data even if state-of-the-art laboratory techniques are applied to retrieve the data. For flash memory-based storage devices, one major drawback of relying solely on the native Read-and-Write interface for performing the overwrite procedure is that areas (identified by physical addresses) not currently mapped to active logical addresses (e.g., Logical Block Addressing (LBA) addresses) are not identified for the overwrite. Those areas include defect areas and currently unallocated or deallocated areas.

Clear, purge, and destroy are classes of actions that can be used to sanitize media. In flash memory-based storage devices, clear includes logical techniques to sanitize data in all user-addressable storage locations for protection against simple non-invasive data recovery techniques. Clear can be applied through the standard Read-and-Write commands to the storage device, such as by rewriting with a new value or using a menu option to reset the device to the factory state. Purge applies physical or logical techniques that makes it infeasible to recover target data. Destroy renders recovering of target data infeasible and results in the subsequent inability to use the media for storage of data. Some destruction techniques render the target data infeasible to retrieve through the device interface and unable to be used for subsequent storage of data. The storage device is not considered destroyed unless target data retrieval is infeasible.

SUMMARY

The arrangements disclosed herein relate to systems, apparatuses, non-transitory computer-readable media, and methods for [ADD WHEN CLAIMS ARE APPROVED]

These and other features, together with the organization and manner of operation thereof, will become apparent from the following detailed description when taken in conjunction with the accompanying drawings.

DETAILED DESCRIPTION

Figure 1:
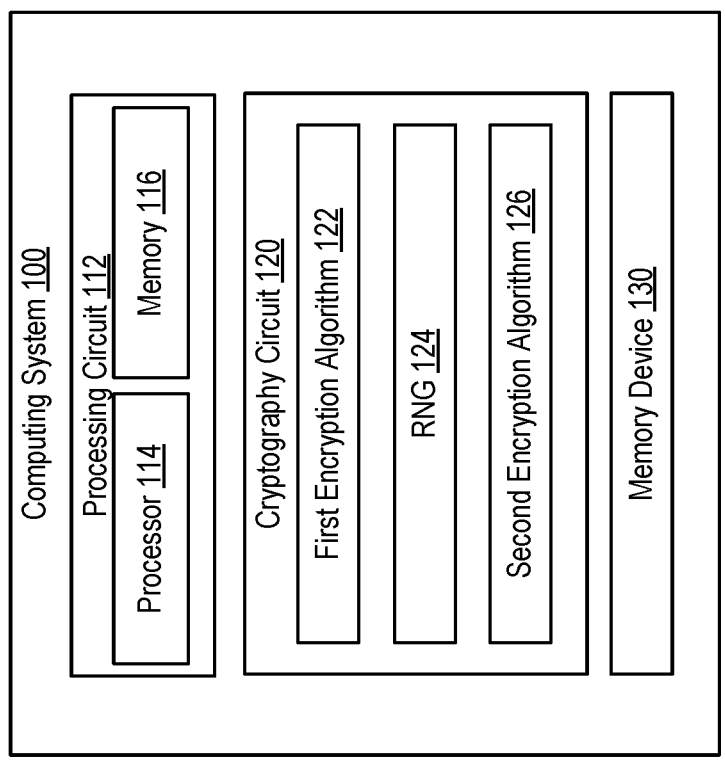
FIG. 1 is a block diagram of an example of a computing system capable of implementing PIECE, according to some arrangements.

The arrangements disclosed herein relate to systems, apparatuses, methods, and non-transitory computer-readable media for Practical Medial Sanitization Using Itemized Encryption for Cryptographic Erasure (PIECE) by obfuscating encrypted data using random keys. For example, ciphertext is further encrypted using random keys to generate doubly-encrypted data. The random keys can be destroyed in response to encrypting the ciphertext. Such doubly-encrypted data cannot be decrypted because the random keys used for the encryption are not available. In some arrangements, the random keys can be generated using Random Number Generators (RNG), Quantum Random Number Generators (QRNG), and so on. Examples of encryption algorithms used to encrypt the ciphertext include Exclusive OR (XOR), Advanced Encryption Standard (AES), Triple Data Encryption Algorithm (3DES), Taylor Series Classical-Quantum Encryption, and so on. In some examples, the encryption algorithms can be randomly selected.

A symmetric encryption algorithm has two inputs, the data and the key, e.g., the cleartext (e.g., a data file) and a cryptographic key. Depending on the mode of operation, The cleartext is divided into one or more data blocks. Each data block is the same size as the data block size of the encryption algorithm. For example, AES has as a data block size of 128 bits, but supports 128-bit, 192-bit, and 256-bit keys. The last cleartext block having less than the data block size of the encryption algorithm is typically padded (e.g., with binary zeros) to reach the data block size. Each block is then encrypted according the mode of operation. A number of the output blocks is the same as a number of input blocks. In the examples in which cleartext blocks denoted as cleartext 1, cleartext 2, . . . , cleartext N are inputted into a symmetric encryption algorithm, ciphertext blocks ciphertext 1, ciphertext 2, . . . , ciphertext N are outputted.

Example modes of operation include National Institute of Standards and Technology (NIST) modes such as Electronic Code Book (ECB), Cipher Block Chaining (CBC), Galois Counter Mode (GCM), Output Feedback (OFB), Counter (CTR), Cipher-Based Message Authentication Code (CMAC), Counter with Cipher Block Chaining Message Authentication Code (CCM), Galois/Counter Mode (GCM), Galois Message Authentication Code (GMAC), XEX-Based Tweaked-Codebook Mode with Ciphertext Stealing (XTS)-AES, Key Wrap, Format-Preserving Encryption (FPE), and so on.

Symmetric decryption is the reverse of symmetric encryption and has two inputs, e.g., the ciphertext and the cryptographic key. The cryptographic key is the same key used in the symmetric encryption algorithm. In symmetric decryption, the cipher blocks are decrypted to recover the cleartext blocks outputted from the encryption algorithm. For example, ciphertext 1, ciphertext 2, . . . , ciphertext N are respectively decrypted to recover cleartext 1, cleartext 2, . . ., cleartext N. Some modes have additional inputs, such as an Initialization Vector (IV) or initial counter, which are the same additional inputs for both encryption and decryption algorithms.

In some arrangements, ciphertext blocks are re-encrypted using random keys to obtain doubly-encrypted ciphertext which cannot be decrypted without the keys. The original key used to encrypt the cleartext blocks cannot decrypt the doubly-encrypted ciphertext. The random keys are unavailable and cannot be regenerated. Accordingly, the doubly-encrypted ciphertext cannot be decrypted without performing an exhaustive key search for each doubly-encrypted ciphertext block. A larger data file leads to more ciphertext blocks, which in turn need more random keys to be encrypted, which in turn leads to larger time and computing resource consumption. For a data file divided into N cleartext blocks, N+1 keys are required to fully decrypt the N doubly-encrypted ciphertext blocks.

FIG. 1 is a block diagram of an example of a computing system 100 capable of implementing PIECE, according to some arrangements. The computing system 100 is a computing system having processing and storage capabilities. In some arrangements, the computing system 100 represents a storage system configured to store data (e.g., data files) as bits or bytes within a suitable memory device 130. Examples of the computing system 100 includes a flash memory-based storage devices, SSDs, Secure Digital (SD) devices, Universal Flash Storage (UFS) devices, Non-Volatile Dual In-Line Memory Module (NVDIMM) devices, and so on. In some arrangements, the computing system 100 can include other types of memory devices such as magnetic storage devices, cloud storage devices, databases, and so on. In some arrangements, the computing system 100 represents a system that includes a storage system or is coupled to such storage system.

The computing system 100 is shown to include various circuits and logic for implementing the operations described herein. More particularly, the computing system 100 includes at least a processing circuit 112, a cryptography circuit 120, the memory device 130, and so on. While various circuits, interfaces, and logic with particular functionality are shown, it should be understood that the computing system 100 includes any number of circuits, interfaces, and logic for facilitating the operations described herein. For example, the activities of multiple circuits (e.g., the components of the cryptography circuit 120) are combined as a single circuit and implemented on a same processing circuit (e.g., the processing circuit 112), as additional circuits with additional functionality are included.

In some arrangements, the processing circuit 112 includes a processor 114 and a memory 116. The processor 114 is implemented as a general-purpose processor, an Application Specific Integrated Circuit (ASIC), one or more Field Programmable Gate Arrays (FPGAs), a Digital Signal Processor (DSP), a group of processing components, or other suitable electronic processing components. The memory 116 (e.g., RAM, ROM, Non-Volatile RAM (NVRAM), flash memory, hard disk storage, etc.) stores data and computer code to be executed by the processor 114 for facilitating the various processes described herein. In some examples, the memory 116 includes tangible, non-transient volatile memory or non-volatile memory. In some examples, the memory 116 includes database components, object code components, script components, or any other type of information structure for supporting the various activities and information structures described herein. The processing circuit 212 can be used to implemented the circuit 120.

In some examples, the memory device 130 is configured to store data as bits or bytes. Examples of the memory device 130 include flash memory or non-volatile memory devices that store data using NAND flash devices. For instance, the memory device 130 includes semiconductor dies that can store data. In some arrangements, the processing circuit 112 corresponds to a controller of a flash memory-based device (e.g., the memory device 130). For example, the processing circuit 112 can be communicably coupled to a host device to receive commands therefrom and send data and information thereto. The processing circuit 112 can control the memory device 130 to perform functions such as read, write, buffer, error correction, garbage collection, and so on. In some examples, the processing circuit 112 can perform Logical-to-Physical (L2P) operations to convert logical addresses received from the host device to physical addresses of the memory device 130. The cryptography circuit 120 can reside within the controller or is coupled to the controller for performing the functions described herein.

The cryptography circuit 120 can perform cryptographic operations described herein. For example, the cryptography circuit 120 can include or implement a first encryption algorithm 122 to encrypt a data file (e.g., cleartext blocks thereof) to obtain ciphertext data (e.g., ciphertext blocks). In some examples, the first encryption algorithm 122 can include symmetric encryption algorithm. A cleartext block and an encryption key (referred to as an original key) can be applied to the first encryption algorithm 122 as inputs, which output a ciphertext block. In some examples, the first encryption algorithm 122 can include another encryption algorithm different from the symmetric encryption algorithm. The cryptography circuit 120 can include an RNG 124 configured to generated a plurality of random numbers, used as random keys by the second encryption algorithm 126 to generate doubly-encrypted ciphertext blocks based on the ciphertext blocks. A ciphertext block and a random key can be applied to the second encryption algorithm 126 as inputs, which output a doubly encrypted ciphertext block. Examples of the second encryption algorithm 126 include XOR, AES, 3DES, Taylor Series Classical-Quantum Encryption, and so on.

The cryptography circuit 120 can be provided in various manners. In some arrangements, the cryptography circuit 120 is a server-based application executable on the computing system 100. In this regard, the user of the computing system 100 has to download the cryptography circuit 120 from an application download server prior to usage. In some arrangements, the cryptography circuit 120 is a web-based interface application provided by an application server. In some arrangements, the cryptography circuit 120 is coded into the memory 116 of the computing system 100. In some arrangements, the cryptography circuit 120 is provided on a separate hardware with software and/or firmware operating the hardware, where the cryptography circuit 120 can be physically connected to the rest of the computing system 100 using a physical connection or a wired connection. In the examples in which the memory device 130 is a flash-based memory devices, the cryptography circuit 120 is provided as firmware (e.g., in the controller or processing circuit 112). All such variations and combinations are intended to fall within the spirit and scope of the present disclosure.

The RNG 124 can be any suitable RNG or QRNG. A QRNG has or is coupled to a quantum entropy source that generates a stream of quantum entangled particles, such as photons containing information (e.g., a string of binary zeroes and ones) to be measured by an entropy measure function to generate random bits. For example, the QRNG might include a Quantum Key Distribution (QKD) device as the quantum entropy source providing the quantum entropy. Other types of RNG can be likewise implemented.

In some examples, media sanitization can erase the data stored on the memory device 130, however data erasure cannot be guaranteed or verified, so physical destruction is often the only viable solution. Cryptographic erase is a sanitization technique used to sanitize encrypted data stored in the medium. Cryptographic erasure or crypto shredding sanitizes cryptographic keys used to encrypt the data, instead of sanitizing the storage locations on the medium containing the encrypted data itself. This leaves only the ciphertext remaining on the medium, thus effectively sanitizing the data by preventing read-access. Without the encryption key used to encrypt the target data, the data is unrecoverable. The level of effort needed to decrypt the ciphertext without the encryption key then is the lesser of the strength of the cryptographic key or the strength of the cryptographic algorithm and mode of operation used to encrypt the data.

An exhaustive key attack is possible but may be presently infeasible. For example, a fast processor that can performing a trillion (1012) AES decryptions per second searching the AES-128 (2128) key space would require about 1019 years. However, the DES Challenge #3 performed in 1999 found a DES (256) key in less than 24 hours using specially designed hardware that did achieve a trillion DES decryptions per second. Thus, assuming today's computers are at least a thousand times faster than a computer in 1999, achieving a quadrillion (1015) AES decryptions per second may be achievable. If the number of AES decryptions per second reaches a nonillion (1030), an AES-128 key can be found in less than a year. Quantum computers may enable such processing power. Given that Shor's Algorithm can undermine the existing asymmetric algorithms, NIST has established the Post-Quantum Cryptography (PQC) for the next generation of asymmetric algorithms. The PQC algorithms will not replace AES. Thus, AES-128 or AES-256 will remain unchanged. Grover's Algorithm is a fast search algorithm that can be used to find an AES key. An AES-256 may be effectively halved from an 256-bit key to an 128-bit key. If Grover's Algorithm running on a quantum computer is combined with a fast classical computer, it may be possible to find AES-256 keys within feasible time. Therefore, existing cryptographic erasure or crypto shredding may not be sufficient.

Figure 2:
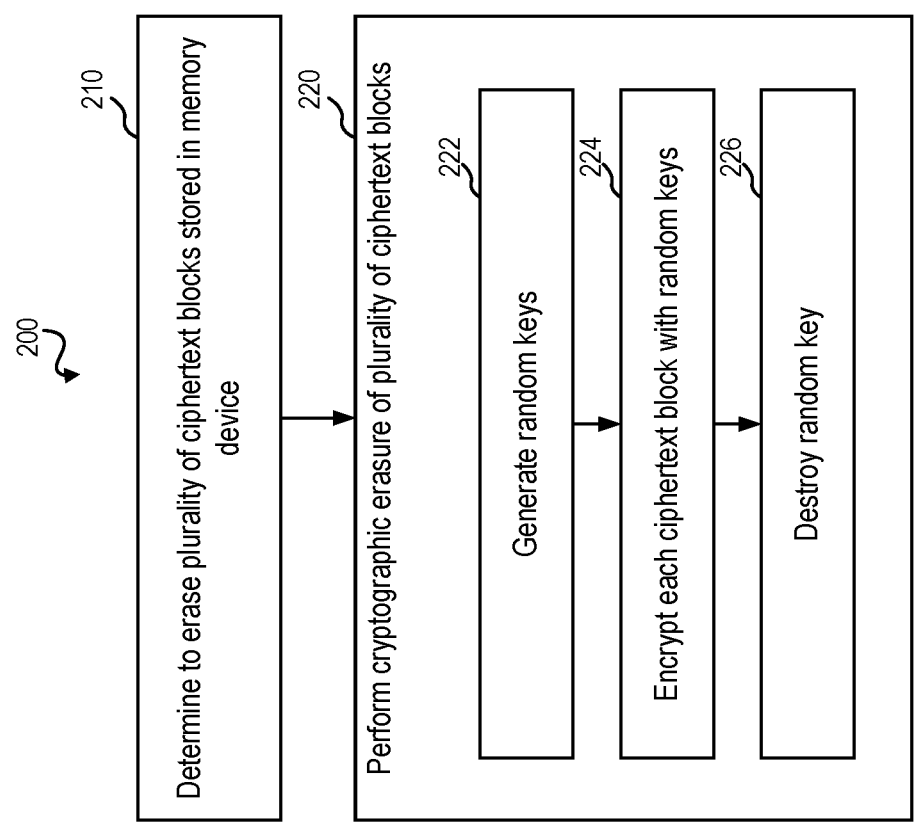
FIG. 2 is a flowchart diagram of an example of a PIECE method, according to some arrangements.

FIG. 2 is a flowchart diagram of an example of a PIECE method 200, according to some arrangements. The method 200 can be performed by the computing system 100. The PIECE method 200 implements cryptographic erasure to sanitize data stored in a medium (e.g., the memory device 130).

At 210, the cryptography circuit 120 determines to erase (e.g., to sanitize, to cryptographically erase, identifies for erasing and so on) a plurality of ciphertext blocks stored in the memory device 130. For example, the cryptography circuit 120 determines to erase the plurality of ciphertext blocks corresponding to data by receiving a request or command from another computing system or from the processing circuit 112 to erase the data stored in the memory device 130. Such request and command may include a logical address (e.g., LBA) of the data, and the processing circuit 112 may identify the physical address of the data as stored in the memory device 130 that corresponds to the logical address. In some examples, the cryptography circuit 120 determines to erase the plurality of ciphertext blocks corresponding to data periodically according to a suitable garbage collection cycle, to erase defective, unallocated, or deallocated areas (identified by physical addresses) of the memory device 130 that are not mapped to any active logical address. The cryptography circuit 120 can determine to erase the plurality of ciphertext blocks corresponding to in response to other suitable triggers.

In some examples, the first encryption algorithm 122 generates the plurality of ciphertext blocks by encrypting a plurality of cleartext blocks of a data file using at least one cryptographic key (e.g., at least one original key). A number of the plurality of cleartext blocks is same as a number of the plurality of ciphertext blocks. A size of each of the plurality of ciphertext blocks is determined based on a mode of operation of the first encryption algorithm 122 for encrypting the plurality of cleartext blocks. Different modes of operation of the first encryption algorithm 122 have different block sizes for the cleartext blocks divided from the data file, and the cleartext blocks are encrypted using the at least one cryptographic key to obtain the ciphertext blocks. In some examples, the first encryption algorithm 122 can include symmetric encryption algorithm.

At 220, in response to determining to erase the plurality of ciphertext blocks, the cryptography circuit 120 performs a cryptographic erasure of the plurality of ciphertext blocks. Cryptographic erasure includes generating random keys at 222, encrypting each of the plurality of ciphertext blocks with a random key at 224, and destroying the random keys in response to encrypting each of the plurality of ciphertext blocks at 226. At 220, the cryptography circuit 120 generates a plurality of doubly-encrypted ciphertext blocks by encrypting each of the plurality of ciphertext blocks with the random key. The cryptography circuit 120 stores the plurality of doubly-encrypted ciphertext blocks in the memory device in place of the plurality of ciphertext blocks, thus achieving cryptographic erasure.

At 222, the RNG 124 generates a plurality of random keys for encrypting the ciphertext blocks. The plurality of random keys includes a different random key for each of the plurality of ciphertext blocks in some examples.

At 224, the second encryption algorithm 126 encrypts each of the plurality of ciphertext blocks using a respective one of the plurality of random keys. In some examples, the plurality of ciphertext blocks are encrypted by the second encryption algorithm 126 using a plurality of encryption algorithms (e.g., XOR, AES, 3DES, Taylor Series Classical-Quantum Encryption, and so on). Each of the plurality of ciphertext blocks is encrypted using at least one of the plurality of encryption algorithms.

For example, a first ciphertext block is encrypted using a first encryption algorithm of the plurality of encryption algorithms, a second ciphertext block is encrypted using a second encryption algorithm of the plurality of encryption algorithms, the first encryption algorithm and the second encryption algorithm are different. In some examples, the one of the plurality of encryption algorithms is randomly selected to encrypt one of the plurality of ciphertext blocks.

For example, encrypting each of the plurality of ciphertext blocks with a random key includes performing a bitwise XOR using one of the plurality of ciphertext blocks and a random key. XOR is a bit-wise operation with two inputs (e.g., two groups of bits) such as the bits of the ciphertext blocks and the bits of the random key and one output (e.g., the bits of the doubly-encrypted ciphertext block). In a bitwise XOR, if the two input bits are the same, the output is a 0-bit. Otherwise, the two input bits are different, and the output is 1 bit. The symbol "⊕" is also used to denote XOR.

At 226, the cryptography circuit 120 destroys each of the plurality of random keys is destroyed in response to encrypting a respective one of the plurality of ciphertext blocks. In other words, after each random key is used to encrypt a ciphertext block, that random key is destroyed and not saved anywhere in the computing system 100 or another system.

Figure 3:
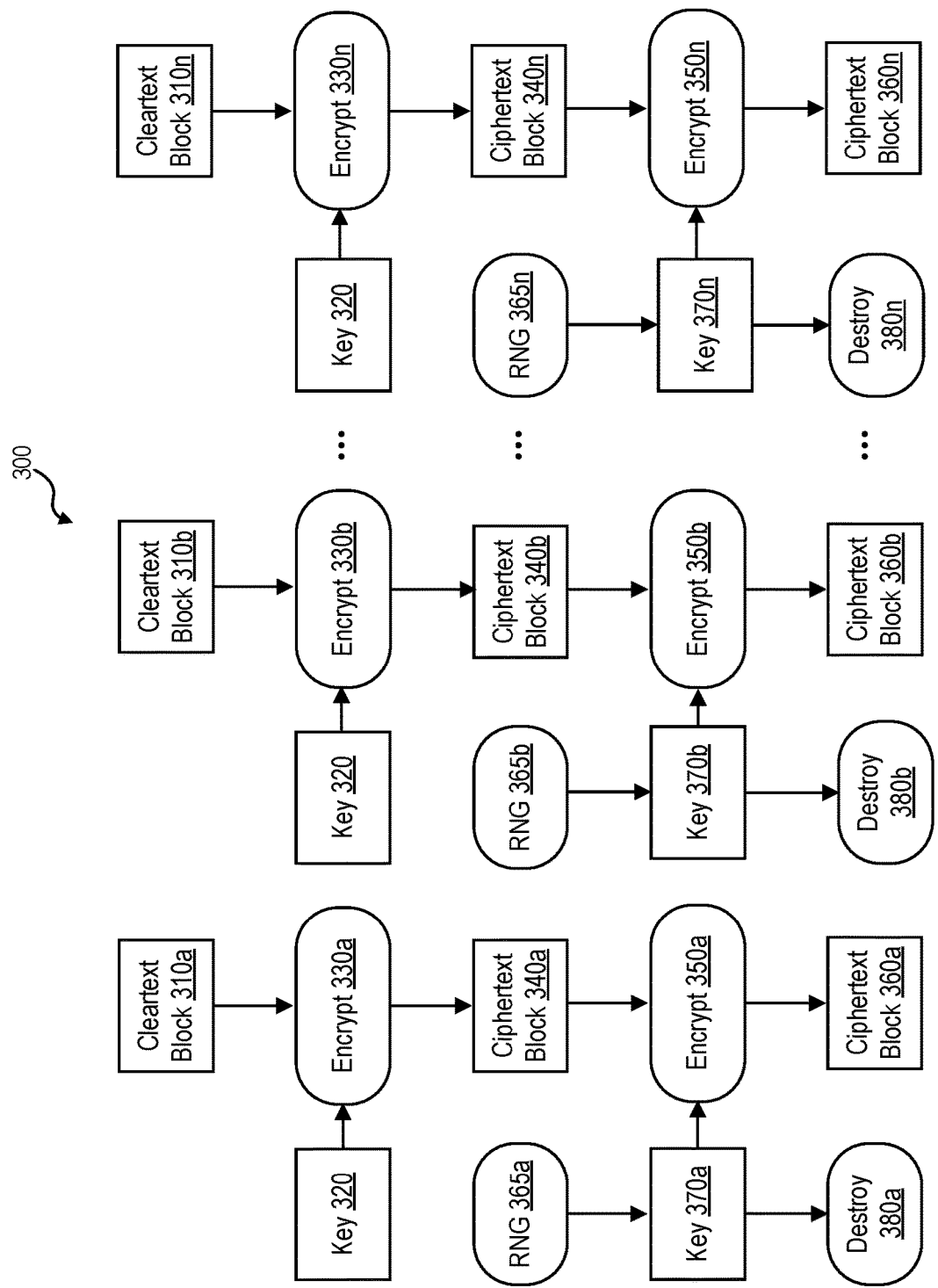
FIG. 3 is a flowchart diagram of an example of a PIECE method for Electronic Code Book (ECB) mode of operation, according to some arrangements.

FIG. 3 is a diagram of an example of a PIECE method 300 for ECB, according to some arrangements. The method 300 can be performed by the computing system 100. The method 300 can be an example of the method 200. ECB is a mode of operation by which the first encryption algorithm 122 can generate ciphertext blocks by encrypting data (e.g., cleartext blocks), where each cleartext block is individually encrypted using the same cryptographic key 320 to produce a ciphertext block. ECB is a mode for symmetric encryption.

For example, data (e.g., a data file) can be divided into n cleartext blocks 310a, 310b, . . . , 310n. The block size of each of the cleartext blocks 310a, 310b, . . . , 310n corresponds to a block size of ECB. The same key 320 (cryptographic key, original key, and so on) is used to encrypt each of the cleartext blocks 310a, 310b, . . . , 310n. For example, the first encryption algorithm 122 includes encrypt functions 330a, 330b, . . . , 330n. Each of the encrypt functions 330a, 330b, . . . , 330n is symmetric encryption using ECB mode of operation. The cleartext block 310a is encrypted using the key 320, e.g., the cleartext block 310a and the key 320 are inputs into the encrypt function 330a, which outputs ciphertext block 340a. The cleartext block 310b is encrypted using the key 320, e.g., the cleartext block 310b and the key 320 are inputs into the encrypt function 330b, which outputs ciphertext block 340b. The cleartext block 310n is encrypted using the key 320, e.g., the cleartext block 310n and the key 320 are inputs into the encrypt function 330n, which outputs ciphertext block 340a. The ciphertext blocks 340a, 340b, . . . , 340n are stored (e.g., written or programmed) to the memory device 130.

To access (e.g., read) cleartext blocks 310a, 310b, . . . , 310n, the ciphertext blocks 340a, 340b, . . . , 340n can be decrypted. For example, each of the ciphertext blocks 340a, 340b, . . . , 340n can be read from the memory device 130 and individually decrypted by the cryptography circuit 120 using the same key 320 to produce a respective one of the cleartext blocks 310a, 310b, . . . , 310n.

In response to determining to erase the ciphertext blocks 340a, 340b, . . . , 340n stored in the memory device 130, the cryptography circuit 120 can perform cryptographic erasure of the ciphertext blocks 340a, 340b, . . . , 340n. For example, the RNG 124 (represented as the RNGs 365a, 365b, . . . , 365n) can generate the plurality of random keys 370a, 370b, . . . , 370n respectively, to be used to encrypt the ciphertext blocks 340a, 340b, . . . , 340n. Each of the random keys 370a, 370b, . . . , 370n can be used to encrypt a respective one of the ciphertext blocks. For example, the second encryption algorithm 126 includes encrypt functions 350a, 350b, . . . , 350n. Each of the encrypt functions 350a, 350b, . . . , 350n can be one of a plurality of encryption algorithms (e.g., XOR, AES, 3DES, Taylor Series Classical-Quantum Encryption, and so on). Each of the encrypt functions 350a, 350b, . . . , 350n can be selected randomly by the cryptography circuit 120. In some examples, two or more of the encrypt functions 350a, 350b, . . . , 350n can be the same cryptographic algorithm.

The ciphertext block 340a is encrypted using the key 370a, e.g., the ciphertext block 340a and the key 370a are inputs into the encrypt function 350a, which outputs ciphertext block 360a. The ciphertext block 340b is encrypted using the key 370b, e.g., the ciphertext block 340b and the key 370b are inputs into the encrypt function 350b, which outputs ciphertext block 360b. The ciphertext block 340n is encrypted using the key 370n, e.g., the ciphertext block 340n and the key 370n are inputs into the encrypt function 350n, which outputs ciphertext block 360n. The ciphertext blocks 360a, 360b, . . . , 360n are doubly-encrypted ciphertext block. In some examples, the ciphertext blocks 360a, 360b, . . . , 360n are stored in the memory device 130 instead of the ciphertext blocks 340a, 340b, . . . , 340n. For example, the ciphertext blocks 360a can be stored in the same physical location, physical address, or area of the memory device 130 as the ciphertext block 340a, replacing the ciphertext block 340a, the ciphertext blocks 360b can be stored in the same physical location, physical address, or area of the memory device 130 as the ciphertext block 340b, replacing the ciphertext block 340b, the ciphertext blocks 360n can be stored in the same physical location, physical address, or area of the memory device 130 as the ciphertext block 340n, replacing the ciphertext block 340n, and so on.

In response to encrypting each of the ciphertext blocks 340a, 340b, . . . , 340n, a respective one of the key 370a, 370b, . . . and 370n is destroyed using a respective one of the destroy functions 380a, 380b, . . . , 380n implemented by the cryptography circuit 120. For example, in response to encrypting the ciphertext block 340a with the key 370a, the key 370a is destroyed by a destroy function 380a. In response to encrypting the ciphertext block 340b with the key 370b, the key 370b is destroyed by a destroy function 380b. In response to encrypting the ciphertext block 340n with the key 370n, the key 370n is destroyed by a destroy function 380n. The destroy functions 380a, 380b, . . . , 380n include purging, erasing, or deleting any cached copy of the keys 370a, 370b, . . . 370n and not saving any copy of the keys 370a, 370b, . . . , 370n anywhere.

Accordingly, given that the ciphertext blocks 360a, 360b, . . . , 360n are saved in the memory device 130 instead of the ciphertext blocks 340a, 340b, . . . , 340n, the ciphertext blocks 340a, 340b, . . . , 340n are cryptographically erased. Given that the ciphertext blocks 360a, 360b, . . . , 360n are doubly encrypted, it is not feasible to recover the ciphertext blocks 340a, 340b, . . . , 340n, much less to recover the cleartext blocks 310a, 310b, . . . , 310n.

Figure 4:
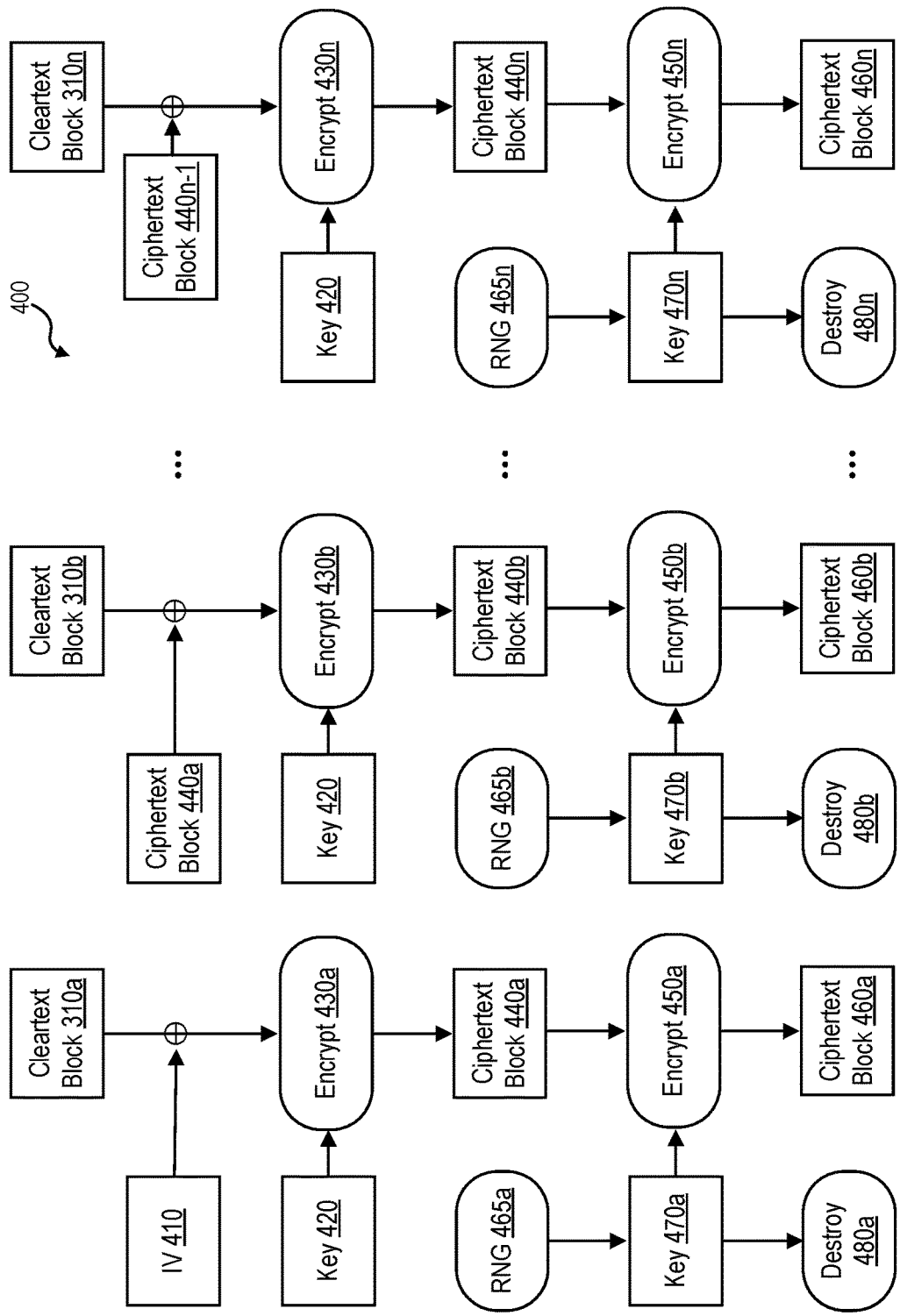
FIG. 4 is a flowchart diagram of an example of a PIECE method for Cipher Block Chaining (CBC) mode of operation, according to some arrangements.

FIG. 4 is a diagram of an example of a PIECE method 400 for CBC, according to some arrangements. The method 400 can be performed by the computing system 100. The method 400 can be an example of the method 200. CBC is a mode of operation by which the first encryption algorithm 122 can generate ciphertext blocks by encrypting data (e.g., cleartext blocks), where each cleartext block is individually encrypted using the same cryptographic key 420 to produce a ciphertext block. CBC is a mode for symmetric encryption.

Each of the cleartext blocks 310a, 310b, . . . , 310n is first modified using XOR (e.g., bitwise XOR denoted as +) and then encrypted using the same cryptographic key 420. For example, data (e.g., a data file) can be divided into n cleartext blocks 310a, 310b, . . . , 310n. The block size of each of the cleartext blocks 310a, 310b, . . . , 310n corresponds to a block size of CBC. The first encryption algorithm 122 includes encrypt functions 430a, 430b, . . . , 430n. Each of the encrypt functions 430a, 430b, . . . , 430n is symmetric encryption using CBC mode of operation. The cleartext block 410a is XORed with an IV 410, which is a random number generated by the RNG 124, and then encrypted using the key 420, e.g., the result of the cleartext block 310a XORed with IV 410 and the key 320 are inputs into the encrypt function 430a, which outputs ciphertext block 440a.

Each subsequent cleartext N is XORed with the previous ciphertext N-1. For example, the cleartext block 410b is XORed with ciphertext block 440a, and then encrypted using the key 420, e.g., the result of the cleartext block 310a XORed with ciphertext 440a and the key 420 are inputs into the encrypt function 430b, which outputs ciphertext block 440b. The cleartext block 410n is XORed with ciphertext block 440n-1, and then encrypted using the key 420, e.g., the result of the cleartext block 310n XORed with ciphertext 440n-1 and the key 420 are inputs into the encrypt function 430n, which outputs ciphertext block 440n. The ciphertext blocks 440a, 440b, . . . , 440n are stored (e.g., written or programmed) to the memory device 130.

To access (e.g., read) cleartext blocks 310a, 310b, . . . , 310n, the ciphertext blocks 440a, 440b, . . . , 440n can be decrypted. For example, each of the ciphertext blocks 440a, 440b, . . . , 440n can be read from the memory device 130 and individually decrypted by the cryptography circuit 120 using the same key 420, and the previous ciphertext is used on the result to produce a respective one of the cleartext blocks 310a, 310b, . . . , 310n. The ciphertext block 440n is decrypted using the key 420, and the result is XORed with the previous ciphertext 440n-1 to recover the cleartext block 310n. The ciphertext block 440b is decrypted using the key 420, and the result is XORed with the previous ciphertext 440a to recover the cleartext block 310a. Decryption continues until ciphertext block 440a is decrypted, and the result is XORed with the original IV 410 to recover the cleartext block 310a.

In response to determining to erase the ciphertext blocks 440a, 440b, . . . , 440n stored in the memory device 130, the cryptography circuit 120 can perform cryptographic erasure of the ciphertext blocks 440a, 440b, . . . , 440n. For example, the RNG 124 (represented as the RNGs 465a, 465b, . . . , 465n) can generate the plurality of random keys 470a, 470b, . . . , 470n respectively, to be used to encrypt the ciphertext blocks 440a, 440b, . . . , 440n. Each of the random keys 470a, 470b, . . . , 470n can be used to encrypt a respective one of the ciphertext blocks. For example, the second encryption algorithm 126 includes encrypt functions 450a, 450b, . . . , 450n. Each of the encrypt functions 450a, 450b, . . . , 450n can be one of a plurality of encryption algorithms (e.g., XOR, AES, 3DES, Taylor Series Classical-Quantum Encryption, and so on). Each of the encrypt functions 450a, 450b, . . . , 450n can be selected randomly by the cryptography circuit 120. In some examples, two or more of the encrypt functions 450a, 450b, . . . , 450n can be the same cryptographic algorithm.

The ciphertext block 440a is encrypted using the key 470a, e.g., the ciphertext block 440a and the key 470a are inputs into the encrypt function 450a, which outputs ciphertext block 460a. The ciphertext block 440b is encrypted using the key 470b, e.g., the ciphertext block 440b and the key 470b are inputs into the encrypt function 450b, which outputs ciphertext block 460b. The ciphertext block 440n is encrypted using the key 470n, e.g., the ciphertext block 440n and the key 470n are inputs into the encrypt function 450n, which outputs ciphertext block 460n. The ciphertext blocks 460a, 460b, . . . , 460n are doubly-encrypted ciphertext block. In some examples, the ciphertext blocks 460a, 460b, . . . , 460n are stored in the memory device 130 instead of the ciphertext blocks 440a, 440b, . . . , 440n. For example, the ciphertext blocks 460a can be stored in the same physical location, physical address, or area of the memory device 130 as the ciphertext block 440a, replacing the ciphertext block 440a, the ciphertext blocks 460b can be stored in the same physical location, physical address, or area of the memory device 130 as the ciphertext block 440b, replacing the ciphertext block 440b, the ciphertext blocks 460n can be stored in the same physical location, physical address, or area of the memory device 130 as the ciphertext block 440n, replacing the ciphertext block 440n, and so on.

In response to encrypting each of the ciphertext blocks 440a, 440b, . . . , 440n, a respective one of the key 470a, 470b, . . . and 470n is destroyed using a respective one of the destroy functions 480a, 480b, . . . , 480n implemented by the cryptography circuit 120. For example, in response to encrypting the ciphertext block 440a with the key 470a, the key 470a is destroyed by a destroy function 480a. In response to encrypting the ciphertext block 440b with the key 470b, the key 470b is destroyed by a destroy function 480b. In response to encrypting the ciphertext block 440n with the key 470n, the key 470n is destroyed by a destroy function 480n. The destroy functions 480a, 480b, . . . , 480n include purging, erasing, or deleting any cached copy of the keys 470a, 470b, . . . , 470n and not saving any copy of the keys 470a, 470b, . . . , 470n anywhere.

Accordingly, given that the ciphertext blocks 460a, 460b, . . . , 460n are saved in the memory device 130 instead of the ciphertext blocks 440a, 440b, . . . , 440n, the ciphertext blocks 440a, 440b, . . . , 440n are cryptographically erased. Given that the ciphertext blocks 460a, 460b, . . . , 460n are doubly encrypted, it is not feasible to recover the ciphertext blocks 440a, 440b, . . . , 440n, much less to recover the cleartext blocks 410a, 410b, . . . , 410n.

Figure 5:
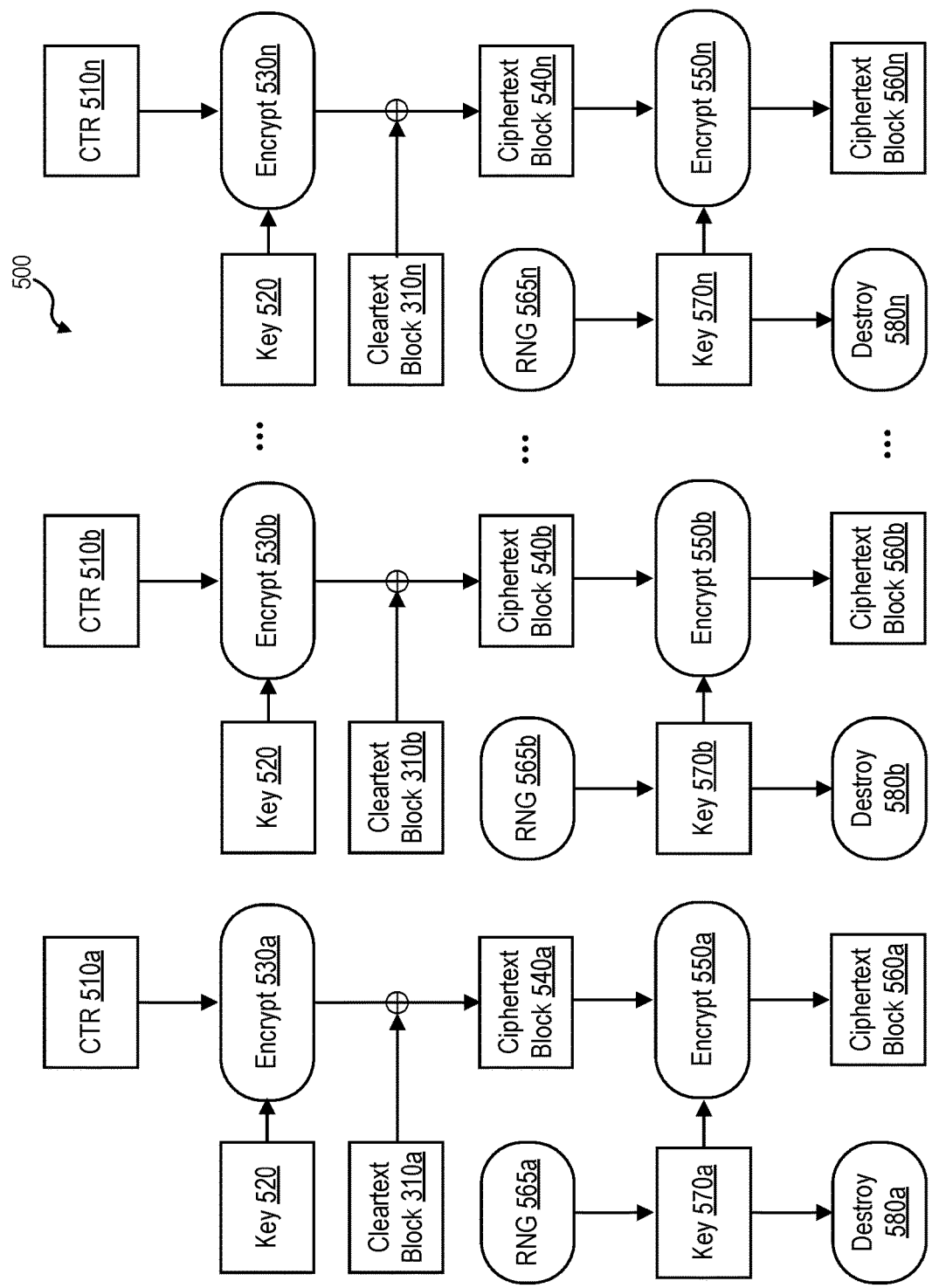
FIG. 5 is a flowchart diagram of an example of a PIECE method for Galois Counter Mode (GCM) mode of operation, according to some arrangements.

FIG. 5 is a diagram of an example of a PIECE method 500 for GCM, according to some arrangements. The method 500 can be performed by the computing system 100. The method 500 can be an example of the method 200. GCM is a mode of operation by which the first encryption algorithm 122 can generate ciphertext blocks by encrypting data (e.g., a counter CTR), where each CTR is individually encrypted using the same cryptographic key 520 to produce a result that is XORed with a ciphertext block. GCM is a mode for symmetric encryption.

For example, data (e.g., a data file) can be divided into n cleartext blocks 310a, 310b, 310n. The block size of each of the cleartext blocks 310a, 310b, . . . , 310n corresponds to a block size of GCM. The same key 520 (cryptographic key, original key, and so on) is used to encrypt a respective CTR, which increases incrementally according to N=1, 2, . . . , n. For example, the first encryption algorithm 122 includes encrypt functions 530a, 530b, . . . , 530n. Each of the encrypt functions 530a, 530b, . . . , 530n is symmetric encryption using GCM mode of operation.

The CTR 510a (e.g., having a value such as 500) is encrypted using the key 520, e.g., the CTR 510a and the key 320 are inputs into the encrypt function 530a, which outputs a result that is XORed (e.g., bitwise XOR) with the cleartext block 310a to generate ciphertext block 540a. The CTR 510b (e.g., having a value such as 501) is encrypted using the key 520, e.g., the CTR 510b and the key 520 are inputs into the encrypt function 530a, which outputs a result that is XORed (e.g., bitwise XOR) with the cleartext block 510b to generate ciphertext block 540b. The CTR 510n (e.g., having a value such as 500+n) is encrypted using the key 520, e.g., the CTR 510n and the key 520 are inputs into the encrypt function 530n, which outputs a result that is XORed (e.g., bitwise XOR) with the cleartext block 310n to generate ciphertext block 540n. The ciphertext blocks 540a, 540b, . . . , 540n are stored (e.g., written or programmed) to the memory device 130.

To access (e.g., read) cleartext blocks 310a, 310b, . . . , 310n, the ciphertext blocks 540a, 540b, . . . , 540n can be decrypted. For example, each of the ciphertext blocks 540a, 540b, . . . , 540n can be read from the memory device 130. A corresponding CTR (e.g., CTR 510n) and the key 520 are run through the encrypt function (e.g., encrypt function 530n) to generate a result, which is XORed (e.g., bitwise XOR) with the ciphertext block (e.g., ciphertext block 520n) to produce a respective cleartext block (e.g., cleartext 310n).

In response to determining to erase the ciphertext blocks 540a, 540b, . . . , 540n stored in the memory device 130, the cryptography circuit 120 can perform cryptographic erasure of the ciphertext blocks 540a, 540b, . . . , 540n. For example, the RNG 124 (represented as the RNGs 565a, 565b, . . . , 565n) can generate the plurality of random keys 570a, 570b, . . . , 570n respectively, to be used to encrypt the ciphertext blocks 540a, 540b, . . . , 540n. Each of the random keys 570a, 570b, . . . , 570n can be used to encrypt a respective one of the ciphertext blocks. For example, the second encryption algorithm 126 includes encrypt functions 550a, 550b, . . . , 550n. Each of the encrypt functions 550a, 550b, . . . , 550n can be one of a plurality of encryption algorithms (e.g., XOR, AES, 3DES, Taylor Series Classical-Quantum Encryption, and so on). Each of the encrypt functions 550a, 550b, . . . , 550n can be selected randomly by the cryptography circuit 120. In some examples, two or more of the encrypt functions 550a, 550b, . . . , 550n can be the same cryptographic algorithm.

The ciphertext block 540a is encrypted using the key 570a, e.g., the ciphertext block 540a and the key 570a are inputs into the encrypt function 550a, which outputs ciphertext block 560a. The ciphertext block 540b is encrypted using the key 570b, e.g., the ciphertext block 540b and the key 570b are inputs into the encrypt function 550b, which outputs ciphertext block 560b. The ciphertext block 540n is encrypted using the key 570n, e.g., the ciphertext block 540n and the key 570n are inputs into the encrypt function 550n, which outputs ciphertext block 560n. The ciphertext blocks 560a, 560b, . . . , 560n are doubly-encrypted ciphertext block. In some examples, the ciphertext blocks 560a, 560b, . . . , 560n are stored in the memory device 130 instead of the ciphertext blocks 540a, 540b, . . . , 540n. For example, the ciphertext blocks 560a can be stored in the same physical location, physical address, or area of the memory device 130 as the ciphertext block 540a, replacing the ciphertext block 540a, the ciphertext blocks 560b can be stored in the same physical location, physical address, or area of the memory device 130 as the ciphertext block 540b, replacing the ciphertext block 540b, the ciphertext blocks 560n can be stored in the same physical location, physical address, or area of the memory device 130 as the ciphertext block 540n, replacing the ciphertext block 540n, and so on.

In response to encrypting each of the ciphertext blocks 540a, 540b, . . . , 540n, a respective one of the key 570a, 570b, . . . and 570n is destroyed using a respective one of the destroy functions 580a, 580b, . . . , 580n implemented by the cryptography circuit 120. For example, in response to encrypting the ciphertext block 540a with the key 570a, the key 570a is destroyed by a destroy function 580a. In response to encrypting the ciphertext block 540b with the key 570b, the key 570b is destroyed by a destroy function 580b. In response to encrypting the ciphertext block 540n with the key 570n, the key 570n is destroyed by a destroy function 580n. The destroy functions 580a, 580b, . . . , 580n include purging, erasing, or deleting any cached copy of the keys 570a, 570b, 570n and not saving any copy of the keys 570a, 570b, . . . , 570n anywhere.

Accordingly, given that the ciphertext blocks 560a, 560b, . . . , 560n are saved in the memory device 130 instead of the ciphertext blocks 540a, 540b, . . . 540n, the ciphertext blocks 540a, 540b, . . . , 540n are cryptographically erased. Given that the ciphertext blocks 560a, 560b, . . . , 560n are doubly encrypted, it is not feasible to recover the ciphertext blocks 540a, 540b, . . . , 540n, much less to recover the cleartext blocks 510a, 510b, . . . , 510n.

Accordingly, the arrangements disclosed herein enable practical implementation for cryptographic erasure for the memory device 130, deter cryptanalysis using classical computers as each random key is wholly independent, deter cryptanalysis using quantum computers as non-linear equations are not advantageous, and provide media sanitization for cloud, third party, and virtualized environments.

As utilized herein, the terms "approximately," "substantially," and similar terms are intended to have a broad meaning in harmony with the common and accepted usage by those of ordinary skill in the art to which the subject matter of this disclosure pertains. It should be understood by those of ordinary skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

Although only a few arrangements have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter described herein. For example, elements shown as integrally formed may be constructed of multiple components or elements, the position of elements may be reversed or otherwise varied, and the nature or number of discrete elements or positions may be altered or varied. The order or sequence of any method processes may be varied or re-sequenced according to alternative arrangements. Other substitutions, modifications, changes, and omissions may also be made in the design, operating conditions and arrangement of the various exemplary arrangements without departing from the scope of the present disclosure.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112 (f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), a distributed ledger (e.g., a blockchain), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web arrangements of the present disclosure could be accomplished with standard programming techniques with rule based logic and other logic to accomplish the various database searching steps, correlation steps, comparison steps and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. A method, comprising:
   identifying a plurality of ciphertext blocks stored in a memory device to erase;
   in response to identifying the plurality of ciphertext blocks to erase, performing a cryptographic erasure of the plurality of ciphertext blocks, wherein the cryptographic erasure comprises:
   encrypting each of the plurality of ciphertext blocks with a random key; and
   destroying the random key in response to encrypting each of the plurality of ciphertext blocks.

2. The method of claim 1, further comprising:
generating a plurality of random keys, wherein the plurality of random keys comprises the random key for each of the plurality of ciphertext blocks; and
encrypting each the plurality of ciphertext blocks using a respective one of the plurality of random keys.

3. The method of claim 2, wherein
the plurality of ciphertext blocks are encrypted using a plurality of encryption algorithms;
a first ciphertext block is encrypted using a first encryption algorithm of the plurality of encryption algorithms;
a second ciphertext block is encrypted using a second encryption algorithm of the plurality of encryption algorithms;
the first encryption algorithm and the second encryption algorithm are different.

4. The method of claim 2, wherein each of the plurality of random keys is destroyed in response to encrypting a respective one of the plurality of ciphertext blocks.

5. The method of claim 3, wherein one of the plurality of encryption algorithms is randomly selected to encrypt one of the plurality of ciphertext blocks.

6. The method of claim 1, wherein the random key is generated using a Random Number Generator (RNG) or a Quantum Random Number Generators (QRNG).

7. The method of claim 1, wherein encrypting each of the plurality of ciphertext blocks with a random key comprises performing a bitwise Exclusive Or (XOR) using each of the plurality of ciphertext blocks and the random key.

8. The method of claim 1, wherein
the plurality of ciphertext blocks are generated by encrypting a plurality of cleartext blocks of a data file using at least one cryptographic key; and
a number of the plurality of cleartext blocks is same as a number of the plurality of ciphertext blocks.

9. The method of claim 8, wherein a size of each of the plurality of ciphertext blocks is determined based on a mode of operation for encrypting the plurality of cleartext blocks.

10. The method of claim 1, wherein the cryptographic erasure comprises:
generating a plurality of doubly-encrypted ciphertext blocks by encrypting each of the plurality of ciphertext blocks with the random key; and
storing the plurality of doubly-encrypted ciphertext blocks in the memory device in place of the plurality of ciphertext blocks.

11. A system, comprising:
a memory; and
a processor configured to:
identify a plurality of ciphertext blocks stored in a memory device to erase;
in response to identifying the plurality of ciphertext blocks to erase, perform a cryptographic erasure of the plurality of ciphertext blocks, wherein the cryptographic erasure comprises:
encrypting each of the plurality of ciphertext blocks with a random key; and
destroying the random key in response to encrypting each of the plurality of ciphertext blocks.

12. The system of claim 11, wherein the processor is further configured to:
generate a plurality of random keys, wherein the plurality of random keys comprises the random key for each of the plurality of ciphertext blocks; and
encrypt each the plurality of ciphertext blocks using a respective one of the plurality of random keys.

13. The system of claim 12, wherein
the plurality of ciphertext blocks are encrypted using a plurality of encryption algorithms; a first ciphertext block is encrypted using a first encryption algorithm of the plurality of encryption algorithms;
a second ciphertext block is encrypted using a second encryption algorithm of the plurality of encryption algorithms;
the first encryption algorithm and the second encryption algorithm are different.

14. The system of claim 12, wherein each of the plurality of random keys is destroyed in response to encrypting a respective one of the plurality of ciphertext blocks.

15. The system of claim 13, wherein one of the plurality of encryption algorithms is randomly selected to encrypt one of the plurality of ciphertext blocks.

16. The system of claim 11, wherein encrypting each of the plurality of ciphertext blocks with a random key comprises performing a bitwise Exclusive Or (XOR) using each of the plurality of ciphertext blocks and the random key.

17. The system of claim 11, wherein
a number of the plurality of cleartext blocks is same as a number of the plurality of ciphertext blocks.

18. The system of claim 17, wherein a size of each of the plurality of ciphertext blocks is determined based on an encryption algorithm used for encrypting the plurality of cleartext blocks.

19. The system of claim 11, wherein the cryptographic erasure comprises:
generating a plurality of doubly-encrypted ciphertext blocks by encrypting each of the plurality of ciphertext blocks with a random key; and
storing the plurality of doubly-encrypted ciphertext blocks in the memory device in place of the plurality of ciphertext blocks.

20. A non-transitory processor-readable medium comprising processor-readable instructions, such that, when executed, causes a processor to:
identify a plurality of ciphertext blocks stored in a memory device to erase;
in response to determining to erase the plurality of ciphertext blocks to erase, perform a cryptographic erasure of the plurality of ciphertext blocks, wherein the cryptographic erasure comprises:
encrypting each of the plurality of ciphertext blocks with a random key; and
destroying each random key in response to encrypting each of the plurality of ciphertext blocks.

* * * * *